(12) United States Patent
Ghosh et al.

(10) Patent No.: US 9,208,764 B2
(45) Date of Patent: Dec. 8, 2015

(54) METHODS AND DEVICES FOR DETERMINING MEDIA FILES BASED ON ACTIVITY LEVELS

(71) Applicant: Google Inc., Mountain View, CA (US)

(72) Inventors: Angana Ghosh, Sunnyvale, CA (US); Marc Stogaitis, San Mateo, CA (US)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 13/935,591

(22) Filed: Jul. 5, 2013

(65) Prior Publication Data

US 2015/0007709 A1    Jan. 8, 2015

(51) Int. Cl.
*G10H 7/00*    (2006.01)
*G10H 1/40*    (2006.01)

(52) U.S. Cl.
CPC ........... *G10H 1/40* (2013.01); *G10H 2220/351* (2013.01); *G10H 2220/355* (2013.01); *G10H 2220/371* (2013.01); *G10H 2240/131* (2013.01)

(58) Field of Classification Search
CPC ................... A63B 2071/0625; A63B 2220/12; A63B 71/0686; A63B 2024/0025; G10H 2220/371; G10H 2220/355
USPC .......................................................... 84/612
See application file for complete search history.

(56) References Cited

U.S. PATENT DOCUMENTS

| | | | | |
|---|---|---|---|---|
| 7,521,623 B2 * | 4/2009 | Bowen | ............... | 84/612 |
| 7,728,214 B2 * | 6/2010 | Oliver et al. | ............... | 84/612 |
| 8,341,557 B2 * | 12/2012 | Pisula et al. | ............... | 715/863 |
| 8,529,407 B2 * | 9/2013 | Nurmela et al. | ............... | 482/1 |
| 8,702,430 B2 * | 4/2014 | Dibenedetto et al. | ......... | 434/247 |
| 8,886,345 B1 * | 11/2014 | Izo et al. | ............... | 700/94 |
| 2006/0243120 A1 * | 11/2006 | Takai et al. | ............... | 84/612 |
| 2006/0253210 A1 * | 11/2006 | Rosenberg | ............... | 700/94 |
| 2007/0113725 A1 * | 5/2007 | Oliver et al. | ............... | 84/612 |
| 2008/0096726 A1 * | 4/2008 | Riley et al. | ............... | 482/8 |
| 2009/0024233 A1 * | 1/2009 | Shirai et al. | ............... | 700/94 |
| 2009/0025539 A1 * | 1/2009 | Sagoo et al. | ............... | 84/609 |
| 2010/0088023 A1 * | 4/2010 | Werner | ............... | 701/206 |

(Continued)

OTHER PUBLICATIONS

A New iPhone/iPod Running App: Pace DJ retrieved from from Internet on Jul. 1, 2013, http://www.runningshoesguru.com/2011107/a-new-iphoneipod-running-app-pacedj/.
Nirjon et al., "MusicalHeart: A Hearty Way of Listening to Music", SenSys'12, Nov. 6-9, 2012, Toronto, ON, Canada. Copyright © 2012 ACM 978-1-4503-1169-4 (http://www.cs.virginia.edu/~stankovic/psfiles/MusicalHeart-SenSys2012-CameraReady.pdf).

*Primary Examiner* — Jeffrey Donels
(74) *Attorney, Agent, or Firm* — McDonnell Boehnen Hulbert & Berghoff LLP

(57) ABSTRACT

Example methods and systems for determining media files based on activity levels are described. An example method includes receiving information indicative of a first speed of the computing device, and receiving information indicative of a geography of a location of the computing device. The method further includes determining, from a plurality of media files tagged with respective tempo identifiers, a first media file based on the geography of the location of the computing device and also having a tempo that substantially matches to the first speed of the computing device. The method includes providing an indication of the first media file to a media player, and based on a change in the first speed of the computing device to a second speed, determining from the plurality of media files tagged with respective tempo identifiers, a second media file having a tempo that substantially matches to the second speed.

21 Claims, 6 Drawing Sheets

(56) References Cited

U.S. PATENT DOCUMENTS

| | | | |
|---|---|---|---|
| 2011/0054646 A1* | 3/2011 | Hernandez et al. | 700/94 |
| 2013/0228063 A1* | 9/2013 | Turner | 84/612 |
| 2013/0263719 A1* | 10/2013 | Watterson et al. | 84/609 |
| 2014/0281971 A1* | 9/2014 | Isbell et al. | 715/716 |

* cited by examiner

METHODS AND DEVICES FOR DETERMINING MEDIA FILES BASED ON ACTIVITY LEVELS

BACKGROUND

Unless otherwise indicated herein, the materials described in this section are not prior art to the claims in this application and are not admitted to be prior art by inclusion in this section.

When training for distance running or exercising in general, people tend to listen to music or watch other types of media files. For a distance runner, preserving energy and preventing injury are key to success, and a maintaining a desired running pace over an amount of time can be difficult. Running outdoors can be difficult to maintain a constant pace due to obstacles or lack of concentration of the runner. Running on a treadmill may be somewhat easier to maintain pace due to control of the pace by the treadmill.

Music can often provide support to maintain a running pace. Music may also provide a runner with an increase in enthusiasm resulting in an energy boost. For example, fatigue occurs when muscles or a cardiorespiratory system hit some kind of physiological limit. When a runner is highly motivated, the runner may be able to push harder toward the limit in pursuit of better performance. All kinds of factors may influence a level of motivation, and music appears to be one of them. Runners typically plan a preset playlist of music prior to a run, and then listen to the music over time.

SUMMARY

In one example, a method is provided that includes receiving, by a processor, information indicative of a first speed of the computing device, and receiving, by the processor, information indicative of a geography of a location of the computing device. The method also includes determining, from a plurality of media files tagged with respective tempo identifiers, a first media file based on the geography of the location of the computing device and also having a tempo that substantially matches to the first speed of the computing device, and providing an indication of the first media file to a media player. The method also includes based on a change in the first speed of the computing device to a second speed, determining from the plurality of media files tagged with respective tempo identifiers, a second media file having a tempo that substantially matches to the second speed.

In another example, a computer readable storage medium having stored therein instructions, that when executed by a device, cause the device to perform functions is provided. The functions comprise receiving information indicative of a first speed of the device, and receiving information indicative of a geography of a location of the device. The functions also comprise determining, from a plurality of media files tagged with respective tempo identifiers, a first media file based on the geography of the location of the device and also having a tempo that substantially matches to the first speed of the device, and providing an indication of the first media file to a media player. The functions also comprise based on a change in the first speed of the device to a second speed, determining from the plurality of media files tagged with respective tempo identifiers, a second media file having a tempo that substantially matches to the second speed.

In still another example, a device is provided that comprises at least one processor, and computer-readable medium, configured to store instructions, that when executed by the processor, cause the device to perform functions. The functions comprise receiving information indicative of a first speed of the device, and receiving information indicative of a geography of a location of the device. The functions also comprise determining, from a plurality of media files tagged with respective tempo identifiers, a first media file based on the geography of the location of the device and also having a tempo that substantially matches to the first speed of the device. The functions also comprise providing an indication of the first media file to a media player, and based on a change in the first speed of the device to a second speed, determining from the plurality of media files tagged with respective tempo identifiers, a second media file having a tempo that substantially matches to the second speed.

In still another example, a system is provided that comprises a means for receiving information indicative of a first speed of the computing device, and means for receiving information indicative of a geography of a location of the computing device. The system also includes a means for determining, from a plurality of media files tagged with respective tempo identifiers, a first media file based on the geography of the location of the computing device and also having a tempo that substantially matches to the first speed of the computing device, and a means for providing an indication of the first media file to a media player. The system also includes a means for based on a change in the first speed of the computing device to a second speed, determining from the plurality of media files tagged with respective tempo identifiers, a second media file having a tempo that substantially matches to the second speed.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

When someone starts to train for distance running, preserving energy and preventing injury is desirable. While training for distance running, a user may lose track of a pace and run faster than desired, rather than maintaining a pace. Maintaining a constant pace can be difficult when running outdoors, and also when running on a treadmill. Music (or other media) can often provide support to maintain a running pace or can provide an energy boost. Within examples described herein, media may be delivered to a user personalized according to a user's running pace. In some examples, a beats per minute (BPM) or tempo is a speed or pace of a given music, and the BPM can be used to serve music personalized to the user's running strides.

In other examples, methods are described to personalize or customize determination of media files in other manners. For example, a method may include receiving, by a computing device, a first speed of the computing device (which may be a running speed, driving speed, cycling speed, etc.), and receiving information indicative of a geography of a location of the computing device. A first media file can be determined based on the geography of the location of the user and also having a tempo that substantially matches to the first speed, and can be provided to a media player of the computing device. Based on a determined change in the first speed, a second media file having a tempo that substantially matches to the new speed level can be determined.

Figure 1:
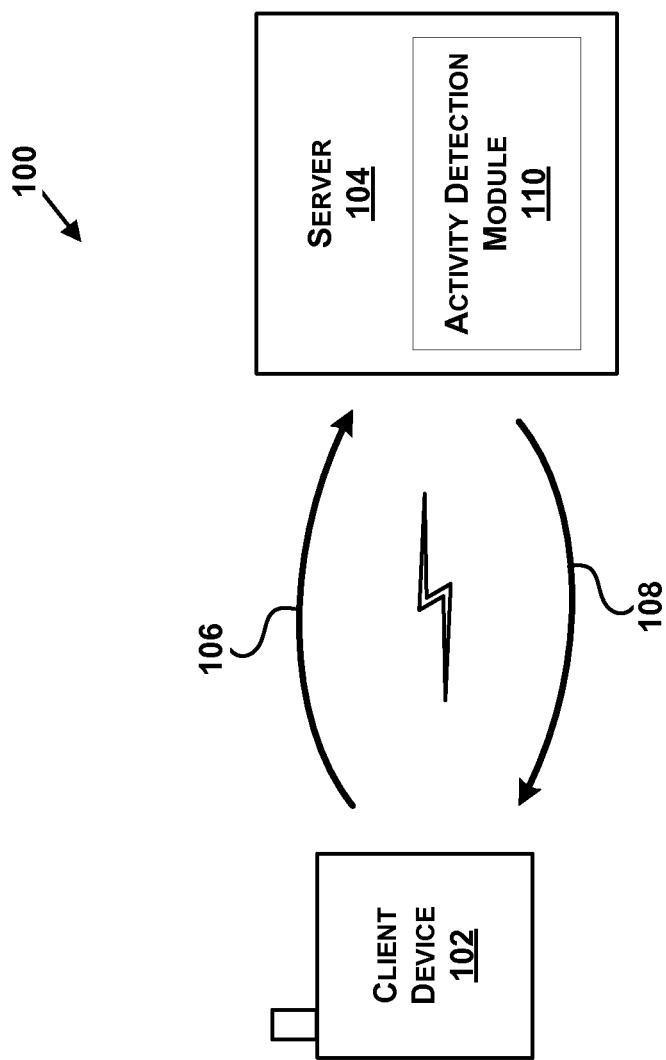
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a media file module 110 which may be configured to process the data 106 received from the client device 102 to determine a media file to provide to the client device 102.

The data 106 received by the server 104 from the client device 102 may take various forms. For example, the client device 102 may information indicative of a location of the client device 102, movement of the client device 102, or inputs from a user of the client device 102. The server 104 may then process the data 106 to identify a media file that matches to the received data.

The data 108 sent to the client device 102 from the server 104 may take various forms. For example, the server 104 may send to the client device 102 an indication of a media file, a copy of a media file, or multiple media files.

Figure 2:
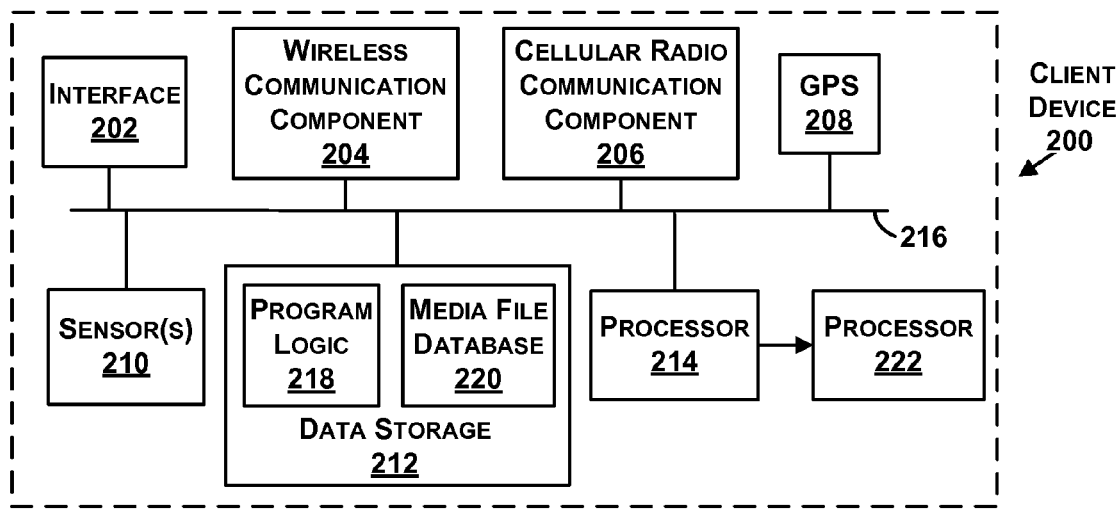
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 206, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless location component 204 may determine the identity of one or more wireless access points (e.g., a MAC address) and measure an intensity of signals received (e.g., received signal strength indication)

from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store a media file database 220 that includes a number of media files, such as songs, videos, etc.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200. Example methods described herein may be performed individually by components of the client device 200, or in combination by one or all of the components of the client device 200. In one instance, portions of the client device 200 may process an audio signal and provide an output internally in the client device 200 to the processor 222, for example. In other instances, portions of the client device 200 may process an audio signal and provide outputs externally to other computing devices.

Figure 3:
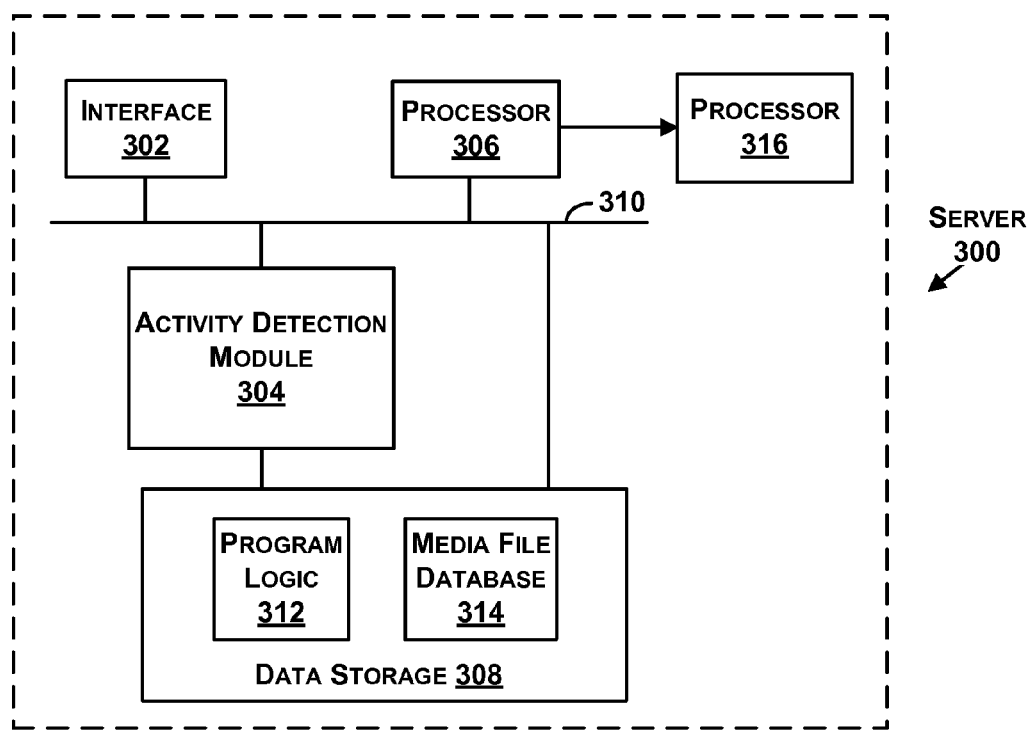
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, an activity detection module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The activity detection module 304 may be configured to receive data from a client device and determine an activity level of a user of the client device. The determination may be based on outputs of an accelerometer, gyroscope, or other sensors of the client device, as well as based on location determinations of the client device.

The data storage 308 may store program logic 312 that can be accessed and executed by the processor 306. The data storage 310 may also a media file database 314 that can be accessed by the processor 306 as well, for example.

The server is illustrated with a second processor 316 which may be an application specific processor for input/output functionality. In other examples, functions of the processor 306 and the processor 316 may be combined into one component.

Figure 4:
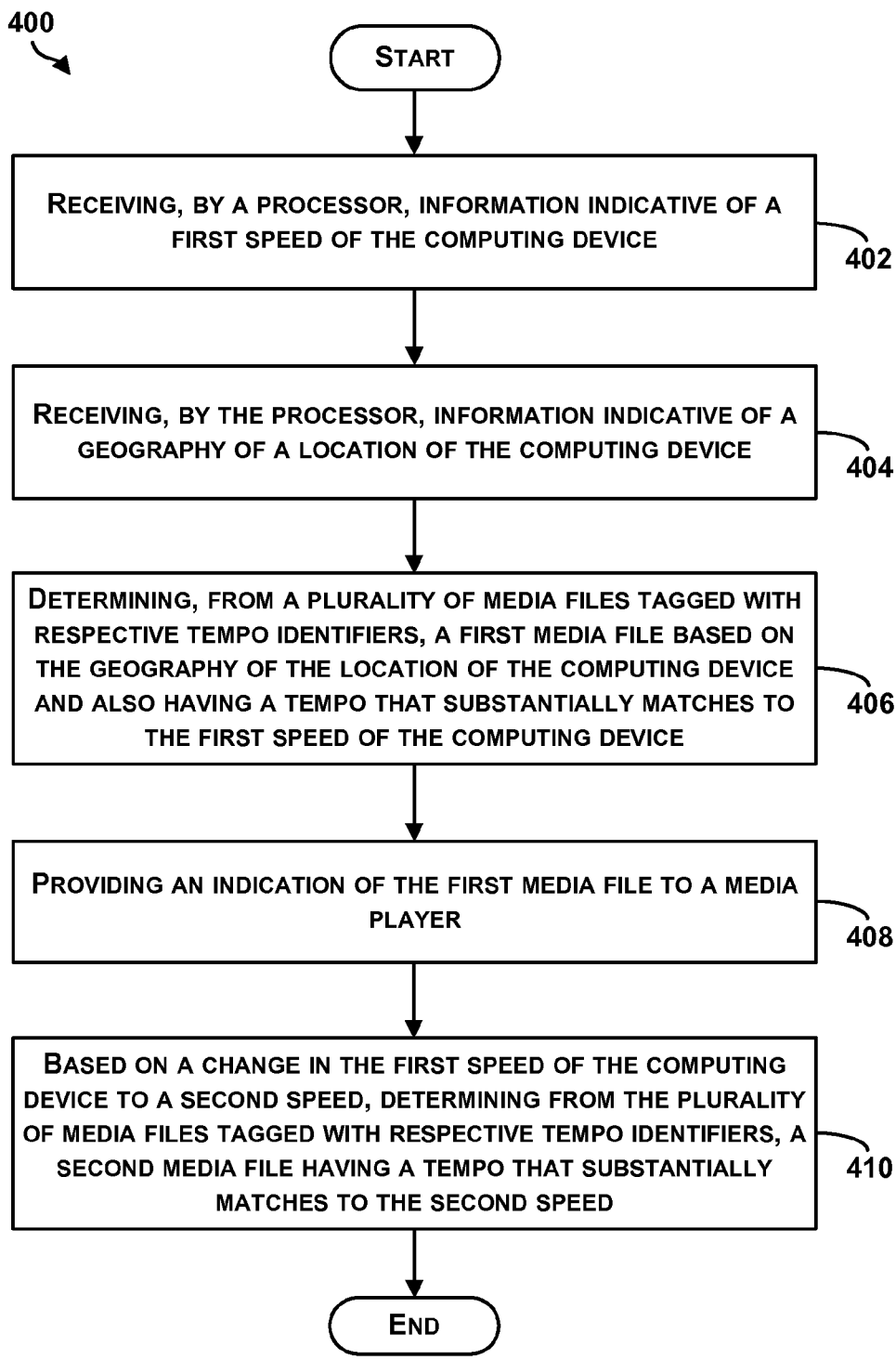
FIG. 4 is a block diagram of an example method for determining a media file based on activity level and geography related to a computing device, in accordance with at least some embodiments described herein.

FIG. 4 is a block diagram of an example method for determining a media file based on activity level and geography related to a computing device, in accordance with at least some embodiments described herein. Method 400 shown in FIG. 4 presents an embodiment of a method that, for example, could be used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

At block 402, the method 400 includes receiving, by a processor, information indicative of a first speed of the computing device. In one example, the computing device may be a mobile phone or mobile media player, and a movement of the computing device may be received to determine the speed at which the computing device is traveling. In an example where the computing device is a mobile media player and a user is exercising, such as running, the speed may be related to an activity level of the user of the computing device. The computing device may have a number of sensors, such as an accelerometer and gyroscope that are capable of determining a number of steps of a user of the computing device over a time period, for example, which in turn can be used or translated into a speed. Specifically, in one example, to detect steps per second, outputs of an accelerometer can be collected and peaks in the outputs may be mapped to a footstep, which can be counted and tracked over time to determine steps per minute. In another example, the computing device may be coupled to a vehicle, and the information indicative of the first speed of the computing device may be related to a given speed at which the vehicle is traveling.

At block 404, the method 400 includes receiving, by the processor, information indicative of a geography of a location of the computing device. The geography may indicate any number of factors about the location including an urban or rural indication, or other characteristics of the specific location, such as a type of the geography including a trail, pavement, a road, etc. The geography of the location of the computing device may further indicate an elevation of the geography, or a topography of the geography as well.

In one example, the location of the computing device can be determined and a geographic map can be referenced to determine information about the geography of the location. In another example, a travel route can be input into the computing device, and a location of the computing device can be determined based on the first speed at which the computing device travels over time. Subsequently, the geography of the location can be determined based on reference to a geographical map.

At block 406, the method 400 includes determining, from a plurality of media files tagged with respective tempo identifiers, a first media file based on the geography of the location of the computing device and also having a tempo that substantially matches to the first speed of the computing device. The method 400 generally includes matching a media file to the tempo and geography of the computing device. In some examples, the method 400 may include matching a media file to only the tempo, or to only the geography, as well as to both the tempo and geography.

In one example, to match to the tempo, the method 400 includes determining that the first media file has a beats per minute of audio substantially matching a strides per minute of a user of the computing device. For instance, in a scenario where the speed is related to a walking/jogging/running speed of a user, then the strides per minute can be determined and matched one to one (1:1) to a beats per minute of a song. In this example, music that matches to a user's running strides can be determined.

The media files may include an audio file, such as a song, and can also include other media such as video (e.g., a movie or television show).

The computing device may store the plurality of media files locally, or may access a database that stores the media files. The plurality of media files may each be associated with a tempo identifier that indicates a tempo classification of the media and/or that indicates a specific beats per minutes (BPM) of the media. The media files may have any number of type of associated identifiers any of which (in any combination) may be used as a basis for determining a matching media file to the speed and geography of the computing device. Table 1 below illustrates an example listing of media files and some example identifiers associated with each specific media file.

TABLE 1

| Media File | Tempo (overall) | Tempo (BPM) | Genre Classification | Geography Classification |
|---|---|---|---|---|
| Song 1 | Slow pace | 90 | Classic | Rural |
| Song 2 | Medium pace | 110 | Rock | City |
| Song 3 | Fast pace | 140 | Pop | City |
| Video | Fast pace/Action | NA | Comedy | City |
| . | | | | |
| . | | | | |
| . | | | | |

In some example, a tempo identifier may be a specific number corresponding to an overall or average beats per minute of the media file. In other examples, the tempo identifier may be a classification of a type of pace of the media file (e.g., slow, medium, fast) which can be mapped to a range of speeds. For example, for a running speed, slow may be mapped to a range of about 0-3 mph, medium may be mapped to a range of about 3-6 mph, and fast may be mapped to speeds above 6 mph.

Example mappings of identifiers or configurations of which identifiers correspond to certain ranges of speeds of the computing device as well as to certain geographic characteristics of a location of the computing device can be preset or configurable by a user so as to be specific to preferences of a user.

At block 406, determining the first media file based on the geography of the location of the computing device may also include matching the media file to a terrain of the location. Example terrains include pavement, trails, city, rural, etc. In an example, a user may go running in an unknown area, and not be sure exactly of the upcoming terrain, and the computing device can be configured to determine characteristics of the terrain and then have geography drive the music delivered to the user.

At block 408, the method 400 includes providing an indication of the first media file to a media player. In one example, the processor may be included in the computing device and may determine the first media file and provide the indication of the first media file to a media player of the computing device, which can access a database of files to locate and to play the media file. In other examples where functions of the method 400 are distributed, a server may determine the first media file and then provide the first media file (or an indicator of the first media file) to the computing device.

At block 410, the method 400 includes based on a change in the first speed of the computing device to a second speed, determining from the plurality of media files tagged with respective tempo identifiers, a second media file having a tempo that substantially matches to the second speed. In some examples, the method 400 is performed over time to continually determine and deliver media files that match to the speed of the computing device.

In some examples, the second media file may be determined based on having a tempo that substantially matches to the second speed, or based on having a tempo that matches to the change in the first speed. For instance, if the change in speed was large, the change in speed may be used as a basis to identify a song with a high beats per minute to provide an up-beat tempo for the user.

The change in the first speed may need to occur and be sustained for a given amount of time in order to trigger determining the second media file. For example, if a user is running and slows down only for a few seconds and then returns to a given pace, the song may not be changed. Thus, for matching songs to a speed, the media files can be transitioned or swapped once the change has been sustained.

In some examples, the method 400 further comprises providing the second media file to the media player, and also providing instructions for a transition between the first media file and the second media file to occur. A length of the transition can be based on an amount of the change in the first speed in an inverse manner. For example, when the change in the speed is small, the transition can be slow, and in an example where the change in speed is large, the transition can be small so that the new media file is provided promptly. In other examples, the computing device may transition to the second media file after completion of playout of the first media file (e.g., wait until the song is over).

In further examples, the method 400 may include determining the second media file based on a history of activity levels of a user of the computing device. In such examples, when a user is running for instance, based on prior running intervals of the user, the second media can be identified. Specifically, for example, if a user has been performing exercises including running at 7 mph over the course of an hour, and today the user maintains the 7 mph pace over only a first 10 minutes and then begins slowing down, the computing device may determine a media file having an increased tempo, based on the user's running history, to encourage the user to run at the increased pace.

In still further examples, the method 400 may also include providing instructions to adjust a volume level of the first media file for play-out based on the first speed of the computing device and/or based on the geography of the location of the computing device. For example, as the computing device moves at faster speeds, it can be expected that there may be increased ambient noise (e.g., due to wind), and the volume can be increased. Similarly, based on a decrease in speed, the volume may also be decreased.

In yet further examples, the method may also include receiving information indicating a predetermined speed (e.g., such as input by a user), and based on the first speed of the computing device being less than the predetermined speed, providing instructions to play-out the first media file at a first given tempo less than a default tempo of the first media file. Similarly, based on the first speed of the computing device being greater than the predetermined speed, the method can include providing instructions to play-out the first media file at a second given tempo greater than the default tempo of the first media file. In this example, a user may set a predetermined running speed, such as 6 mph, and when the computing device determines that the user is running slower than the desired speed, the media file can be played out at a slower tempo than default to provide a signal to the runner to speed up. Also, when the user is running faster than the predetermined speed, the computing device can speed-up play-out of the song to signal to the runner to slow down. Once the runner notices a play-out of the song at a normal or default speed, the runner can have an indication that the runner is running at or about at the predetermined or preset speed level. Such functions can be helpful to a runner to maintain a desired pace over a longer time period. Ultimately, a runner can naturally synchronize his or her steps with a song's tempo to runners, walkers, or cyclists maintain an optimum pace, while also being a powerful source of motivation.

Functions of the method 400 may be fully performed by the computing device, or may be distributed across the computing device and a server. In some examples, the computing device may receive information from sensors of the computing device, or where the computing device is a server the information can be received from another device that collects the information. The computing device could further communicate with a server to determine the matching media files, for example.

Figure 5:
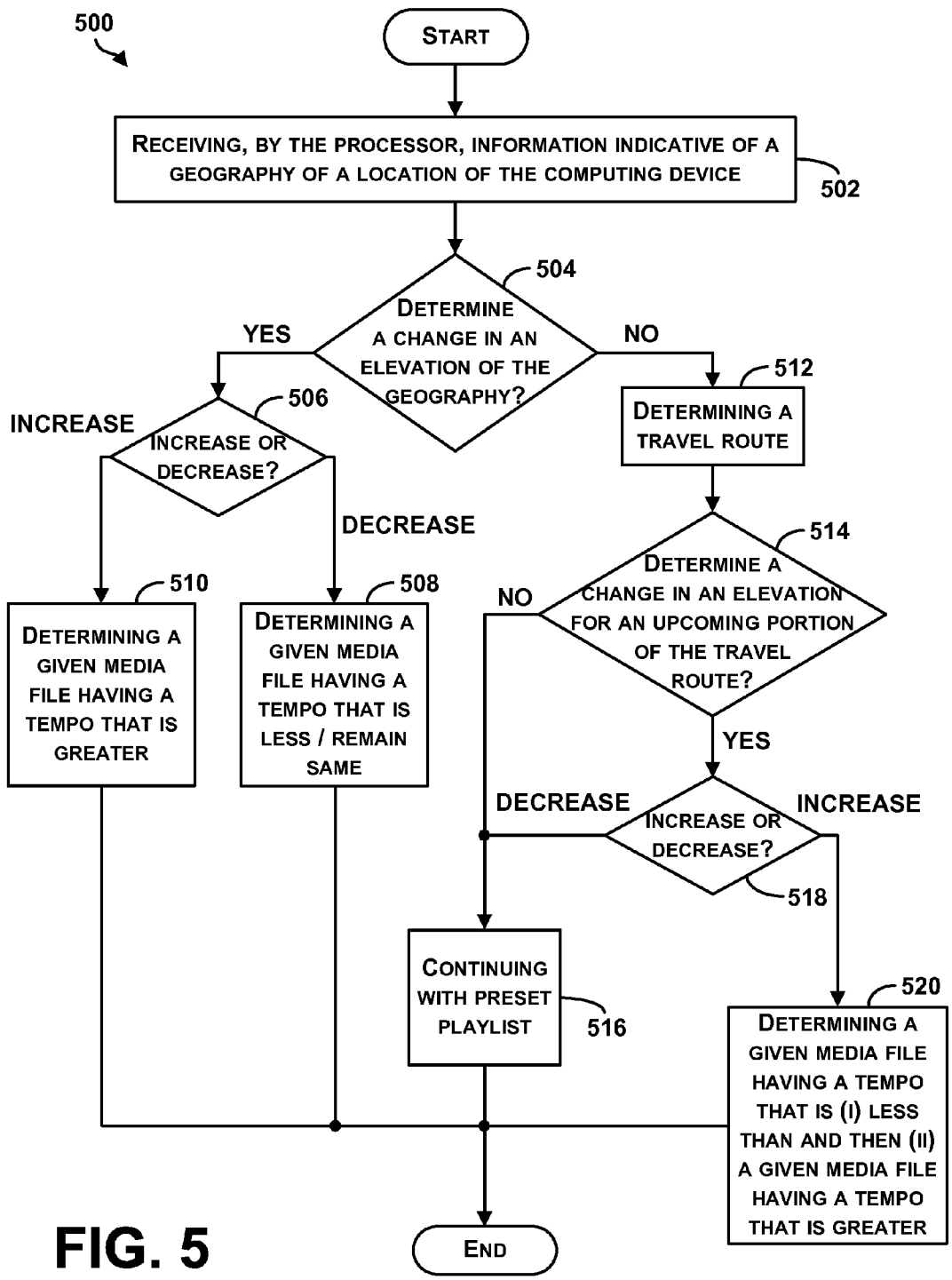
FIG. 5 is a block diagram of another example method for determining a media file based geography related to a computing device, in accordance with at least some embodiments described herein.

FIG. 5 is a block diagram of another example method for determining a media file based geography related to a computing device, in accordance with at least some embodiments described herein. Method 500 shown in FIG. 5 presents an embodiment of a method that, for example, could be used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3. Method 500 may include one or more operations, functions, or actions as illustrated by one or more of blocks 502-520. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes receiving, by the processor, information indicative of a geography of a location of the computing device, and may be similar to functions described with respect to the method 400 in FIG. 4.

At block 504, the method 500 determining a change in an elevation of the geography. In some examples, the computing may include sensors configured to collect data indicative of any change in elevation. In other examples, the computing device may determine a location of the computing device, and access a geographical or topographical map to determine an elevation of the location, and then to determine any changes of the elevation over time as the computing device changes locations. In other examples, where a user is running on a treadmill, the processor may communicate with the treadmill to determine the elevation or change in elevation of the treadmill over time.

Based on determining a change in the elevation, as shown at block 506, when the change is a decrease in the elevation, the method 500 includes determining a given media file having a tempo that is less than or about equal to a currently played media file, at block 508. For instance, when the method 500 is performed by a computing device used as a media player by a runner that is running, and when the elevation decreases, the computing device can determine a slower song to deliver to the runner to signal to the runner to possibly slow down a pace of the run while running downhill.

Based on determining a change in the elevation, as shown at block 506, when the change is an increase in the elevation, the method 500 includes determining a given media file having a tempo that is greater than a currently played media file, at block 510. For instance, when the method 500 is performed by a computing device used as a media player by a runner that is running, and when the elevation increases, the computing device can determine a faster song to deliver to the runner to provide encouragement to the runner to run up a hill.

Based on no change in the elevation being determined, the method 500 may include determining a travel route, as shown at block 512. A travel route may be input by a user prior to starting a run, or may be determined or estimated by the computing device based on determining locations of the computing device over time and mapping to a geographic map to identify possible trails, streets, etc. that the runner has been following and may continue to follow. The computing device can estimate a trajectory based on the route run by the user to determine possible routes over which the user will continue to run.

At block 514, the method 500 includes determining that the elevation of the geography changes for an upcoming portion of the travel route. Changes in the elevation can be determined as described above.

Based on no change in the elevation for the upcoming travel route, the method 500 includes continuing with the preset playlist, as shown at block 516.

Based on a change in the elevation for the upcoming travel route, the method 500 includes determining whether the change is an increase or decrease, at block 518. For a decrease, the method may continue with the preset playlist, as shown at block 516.

Based on an increase in the elevation for the upcoming travel route, the method 500 includes determining a given media file having a tempo that is less than a speed of the computing device, and then determining a given media file having a tempo that is greater than a speed of the computing device, at block 520. For example, the computing device can be configured to first deliver a slow song to the runner to try to conserve energy by causing the runner to slow a pace, and then as the change in elevation occurs at the upcoming portion, the faster paced song can be delivered to provide encouragement to the runner to run uphill.

Figure 6:
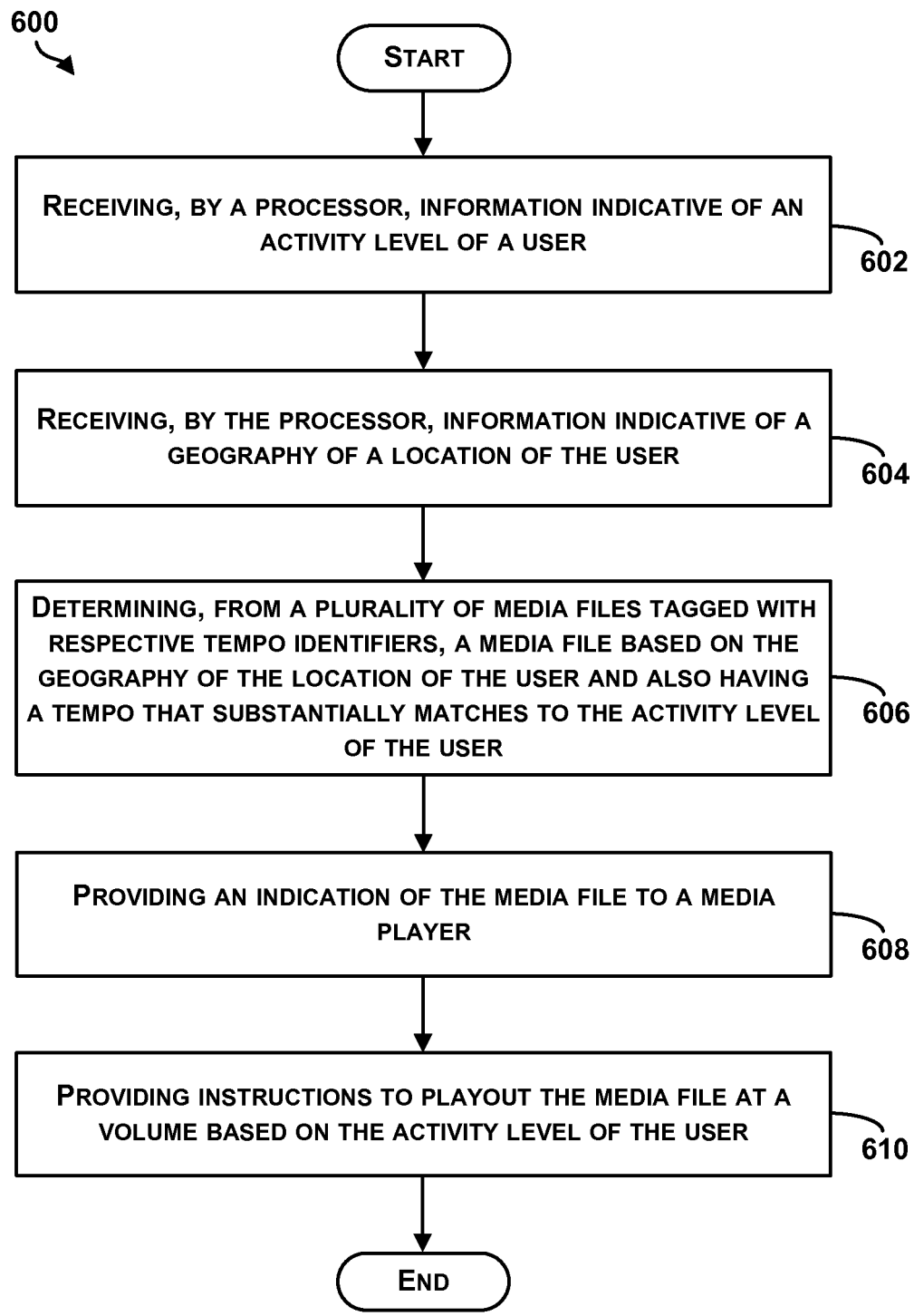
FIG. 6 is a block diagram of another example method for determining a media file based an activity level of a user, in accordance with at least some embodiments described herein.

FIG. 6 is a block diagram of another example method for determining a media file based an activity level of a user, in accordance with at least some embodiments described herein. Method 600 shown in FIG. 6 presents an embodiment of a method that, for example, could be used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3. Method 600 may include one or more operations, functions, or actions as illustrated by one or more of blocks 602-610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 includes receiving, by a processor, information indicative of an activity level of a user. The activity level of the user may be determined in many ways. In one example, the user may carry a computing device, and a speed of the computing device may be indicative of the activity level of the user. In other examples, any sensors on the computing device or on the user, such as an accelerometer or a gyroscope, may collect data that can be interpreted and used to classify an activity level of the user. Other information can be determined and used in combination to estimate an activity level, such as a location of the user (e.g., remain in same location over time or moving, or in an office versus outdoors), a time of day, pictures form a camera, ambient light, ambient sound, or how the user is interacting with other devices operatively connected to or in communication with a device the user carries, for example.

Activity levels of a user may also be determined by a wearable device of the user, which may include sensors that communicate with the processor, and can be configured to continuously monitor a heart rate and activity level of the user. The activity level information may be determined based on a duty cycle so as to receive periodic updates of user activity level. For example, if a user of the device is currently on foot, in a car, on a bicycle or still can be determined over time.

At block 604, the method 600 includes receiving, by the processor, information indicative of a geography of a location of the user. Such information may be similar to that as described above with reference to FIGS. 4 and 5.

At block 606, the method 600 includes determining, from a plurality of media files tagged with respective tempo identifiers, a media file based on the geography of the location of the user and also having a tempo that substantially matches to the activity level of the user. At block 608, the method 600 includes providing an indication of the media file to a media player. At block 610, the method 600 includes providing instructions to playout the media file at a volume based on the activity level of the user. Such functions may be similar to those described above with reference to FIGS. 4 and 5.

Thus, within examples, method 600 may be performed to determine media files that match more generally to an activity level of a user, and the activity level can be based or inferred from any number of factors.

In some examples, methods described herein may be used by runners within a training regimen for distance running to help a runner maintain a pace. Running may be done outdoors, in which songs can be determined for play out on a portable media player, or indoors on a treadmill where songs or other types of media (movies) can be determined for play out on media players, televisions, etc. The right music can often provide support to maintain a running pace, and also provide an energy boost at the right time. Thus, methods described herein can be performed to serve media personalized to a user's running strides.

Figure 7:
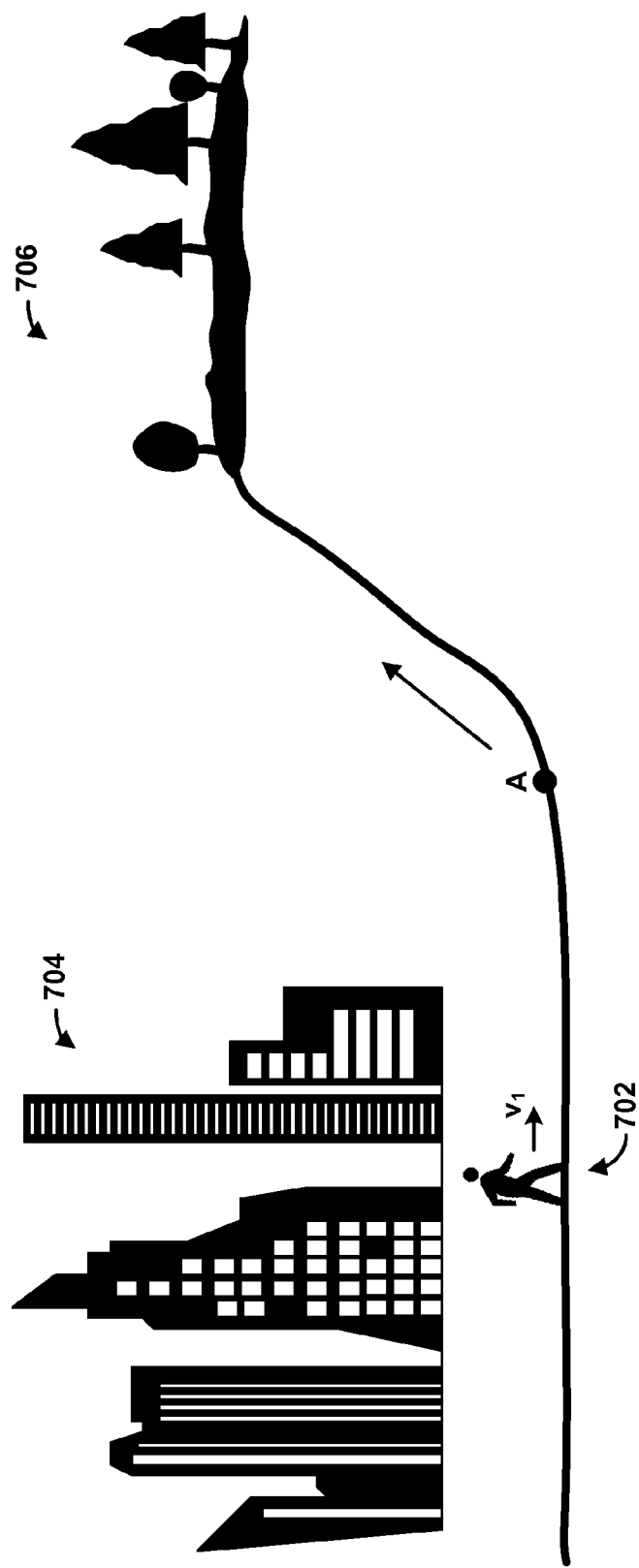
FIG. 7 is a conceptual illustration of an example execution of methods described herein.

FIG. 7 is a conceptual illustration of an example execution of methods described herein. In FIG. 7, a user 702 may be running along a street in a city or urban area 704 at a pace of $v_1$. The user 702 may carry a portable media player that is configured to play music that has a tempo that substantially matches to the speed of the user 702, and also be related to the geography of the location of the user 702. Here, the computing device may select a song to play that has a beats per minute substantially matching speed $v_1$, and that has been classified as a song to play in an urban area. The computing device may be configured to determine that a travel route of the user 702 will take the user 702 up a hill and into a rural area 706. The computing device can provide a song having a tempo faster than speed $v_1$ once the user 702 arrives at location A, so as to provide encouragement to the user 702 to run up the hill. As the user 702 enters the rural area 706, the computing device can be configured to provide yet another song that has a tempo or classification matching to the rural area 706.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a computing device having one or more processors and memory, the method comprising:
   receiving information indicative of a first speed of the computing device;
   receiving information indicative of a geography of a location of the computing device;
   determining by the computing device, from a plurality of media files tagged with respective tempo identifiers, a first media file based on the geography of the location of the computing device and also having a tempo that substantially matches to the first speed of the computing device;
   providing an indication of the first media file to a media player;
   based on a change in the first speed of the computing device to a second speed, determining from the plurality of media files tagged with respective tempo identifiers, a second media file having a tempo that substantially matches to the second speed;
   providing an indication of the second media file to the media player; and
   providing instructions for a transition between the first media file and the second media file to occur, wherein a length of the transition is based on an amount of the change in the first speed.

2. The method of claim 1, wherein receiving information indicative of the first speed of the computing device comprises receiving information indicative of a movement of the computing device related to an activity level of a user of the computing device.

3. The method of claim 1, wherein receiving information indicative of the first speed of the computing device comprises:
   determining a number of steps of a user of the computing device over a time period based on information received from a sensor of the computing device.

4. The method of claim 1, wherein determining, from the plurality of media files tagged with respective tempo identifiers, the first media file having the tempo that substantially matches to the first speed of the computing device comprises:
   determining that the first media file has a beats per minute of audio substantially matching a strides per minute of a user of the computing device.

5. The method of claim 1, further comprising determining from the plurality of media files tagged with respective tempo identifiers, the second media file having the tempo that substantially matches to the second speed and to the change in the first speed.

6. The method of claim 1, further comprising determining the second media file based on a history of activity levels of a user of the computing device.

7. The method of claim 1, wherein receiving information indicative of the geography of the location of the computing device comprises:
   receiving a travel route;
   determine the location of the computing device based on the first speed of the computing device over time; and
   determining the geography of the location based on reference to a geographical map.

8. The method of claim 1, wherein determining the first media file based on the geography of the location of the computing device comprises:
   determining the first media file based on a type of the geography.

9. The method of claim 1, wherein the computing device is coupled to a vehicle, and wherein receiving the information indicative of the first speed of the computing device comprises receiving information indicative of a given speed of the vehicle.

10. The method of claim 1, wherein determining the first media file based on the geography of the location of the computing device comprises:
    determining the first media file based on an elevation of the geography.

11. The method of claim 10, further comprising:
    determining a change in the elevation of the geography; and
    based on the change being an increase in the elevation, determining the first media file comprises determining a given media file having a tempo that is greater than a speed of the computing device.

12. The method of claim 10, further comprising:
    determining a travel route;
    determining that the elevation of the geography increases for an upcoming portion of the travel route; and
    wherein determining the first media file comprises determining a given media file having a tempo that is greater than a speed of the computing device.

13. The method of claim 10, further comprising:
    determining a travel route;
    determining that the elevation of the geography increases for an upcoming portion of the travel route; and
    wherein determining the first media file comprises determining a given media file having a tempo that is less than a speed of the computing device.

14. The method of claim 1, further comprising:
    providing instructions to adjust a volume level of the first media file for play-out based on the first speed of the computing device and based on the geography of the location of the computing device.

15. The method of claim 1, further comprising:
    receiving information indicating a predetermined speed;
    based on the first speed of the computing device being less than the predetermined speed, providing instructions to play-out the first media file at a first given tempo less than a default tempo of the first media file; and based on the first speed of the computing device being greater than the predetermined speed, providing instructions to play-out the first media file at a second given tempo greater than the default tempo of the first media file.

16. A computer-readable medium having stored therein instructions, that when executed by a device, cause the device to perform functions comprising:

receiving information indicative of a first speed of the device;

receiving information indicative of a geography of a location of the device;

determining, from a plurality of media files tagged with respective tempo identifiers, a first media file based on the geography of the location of the device and also having a tempo that substantially matches to the first speed of the device;

providing an indication of the first media file to a media player;

based on a change in the first speed of the device to a second speed, determining from the plurality of media files tagged with respective tempo identifiers, a second media file having a tempo that substantially matches to the second speed;

providing an indication of the second media file to the media player; and providing instructions for a transition between the first media file and the second media file to occur, wherein a length of the transition is based on an amount of the change in the first speed.

17. The computer-readable medium of claim 16, wherein the functions further comprise:

determining a travel route;

determining that an elevation of the geography increases for an upcoming portion of the travel route;

determining a first given media file having a tempo that is less than a current speed of the device;

providing an indication of the first given media file to the media player;

based on arriving at the upcoming portion of the travel route, determining a second given media file having a tempo that is greater than the current speed of the computing device; and providing an indication of the second given media file to the media player.

18. A device, comprising:

one or more processors; and a computer-readable medium, configured to store instructions, that when executed by the one or more processors, cause the device to perform functions comprising:

receiving information indicative of a first speed of the device;

receiving information indicative of a geography of a location of the device;

determining, from a plurality of media files tagged with respective tempo identifiers, a first media file based on the geography of the location of the device and also having a tempo that substantially matches to the first speed of the device;

providing an indication of the first media file to a media player;

based on a change in the first speed of the device to a second speed, determining from the plurality of media files tagged with respective tempo identifiers, a second media file having a tempo that substantially matches to the second speed;

providing an indication of the second media file to the media player; and providing instructions for a transition between the first media file and the second media file to occur, wherein a length of the transition is based on an amount of the change in the first speed.

19. The device of claim 18, wherein the functions further comprise:

receiving information indicating a predetermined speed;

based on the first speed of the device being less than the predetermined speed, providing instructions to play-out the first media file at a first given tempo less than a default tempo of the first media file; and based on the first speed of the device being greater than the predetermined speed, providing instructions to play-out the first media file at a second given tempo greater than the default tempo of the first media file.

20. A method performed by a computing device having one or more processors and memory, wherein the computing device is coupled to a vehicle, the method comprising:

receiving information indicative of a first speed of the computing device including information indicative of a given speed of the vehicle;

receiving information indicative of a geography of a location of the computing device;

determining by the computing device, from a plurality of media files tagged with respective tempo identifiers, a first media file based on the geography of the location of the computing device and also having a tempo that substantially matches to the first speed of the computing device;

providing an indication of the first media file to a media player;

based on a change in the first speed of the computing device to a second speed, determining from the plurality of media files tagged with respective tempo identifiers, a second media file having a tempo that substantially matches to the second speed; and providing an indication of the second media file to the media player.

21. A method performed by a computing device having one or more processors and memory, the method comprising:

receiving information indicative of a first speed of the computing device;

receiving information indicative of a geography of a location of the computing device;

determining by the computing device, from a plurality of media files tagged with respective tempo identifiers, a first media file based on the geography of the location of the computing device and also having a tempo that substantially matches to the first speed of the computing device;

providing an indication of the first media file to a media player;

providing instructions to adjust a volume level of the first media file for play-out based on the first speed of the computing device and based on the geography of the location of the computing device;

based on a change in the first speed of the computing device to a second speed, determining from the plurality of media files tagged with respective tempo identifiers, a second media file having a tempo that substantially matches to the second speed; and providing an indication of the second media file to the media player.

* * * * *